United States Patent [19]

Yoneda et al.

[11] Patent Number: 4,707,536

[45] Date of Patent: Nov. 17, 1987

[54] CATALYTIC PREPARATION OF AROMATIC POLYKETONE FROM PHOSGENE AND AROMATIC ETHER OR SULFIDE

[75] Inventors: Norihiko Yoneda; Tsuyoshi Fukuhara, both of Sapporo; Seiichi Nozawa, Yamato, all of Japan

[73] Assignee: Mitsubishi Chemical Industries Limited, Tokyo, Japan

[21] Appl. No.: 804,615

[22] Filed: Dec. 5, 1985

[30] Foreign Application Priority Data

Dec. 11, 1984 [JP] Japan ............................ 59-261531
Mar. 28, 1985 [JP] Japan ............................ 60-64287

[51] Int. Cl.$^4$ ..................... C08G 65/00; C08G 83/00
[52] U.S. Cl. ................................ 528/198; 528/196; 528/200; 528/220; 528/370; 528/371; 528/372
[58] Field of Search ............... 528/198, 200, 371, 196, 528/370, 372, 220

[56] References Cited

U.S. PATENT DOCUMENTS

| | | | |
|---|---|---|---|
| 3,065,205 | 11/1962 | Bonner ............................ | 528/200 |
| 3,385,825 | 5/1968 | Goodman et al. ................ | 528/200 |
| 3,441,538 | 4/1969 | Marks ............................ | 260/49 |
| 3,953,400 | 4/1976 | Dahl .............................. | 528/206 |
| 4,361,693 | 11/1982 | Jansons ........................... | 528/198 |
| 4,396,755 | 8/1983 | Rose .............................. | 528/126 |
| 4,398,020 | 8/1983 | Rose .............................. | 528/207 |

FOREIGN PATENT DOCUMENTS 0124276 11/1984 European Pat. Off. .
0135938 4/1985 European Pat. Off. .

*Primary Examiner*—Harold D. Anderson
*Attorney, Agent, or Firm*—Oblon, Fisher, Spivak, McClelland, & Maier

[57] ABSTRACT

Disclosed herein is a process for producing aromatic polyketone, comprising reacting a compound represented by the formula (I):

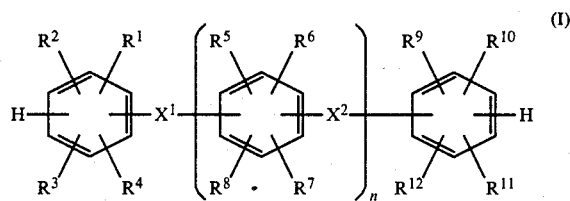

wherein each of $R^1$ to $R^{12}$ represents a hydrogen atom, a halogen atom, a hydrocarbon group or an alkoxy group; $X^1$ and $X^2$ respectively represent an oxygen atom or a sulfur atom and n is an integer of from 0 to 5, with phosgene (i) in the presence of a fluoroalkanesulfonic acid or (ii) in hydrogen fluoride in the presence of boron trifluoride at a temperature of from 65° to 90° C.

10 Claims, No Drawings

CATALYTIC PREPARATION OF AROMATIC POLYKETONE FROM PHOSGENE AND AROMATIC ETHER OR SULFIDE

BACKGROUND OF THE INVENTION

The present invention relates to a process for producing aromatic polyketone.

It has been known that aromatic polyketone is excellent in thermal resistance, mechanical properties, electric properties and dimensional stability, is low in water absorption and accordingly, is a remarkably favorable polymer. Although as a process for producing aromatic polyketone, a process comprising reacting 4-phenoxybenzoyl chloride in the presence of boron trifluoride in hydrogen fluoride as a solvent and a process comprising reacting bis-(4-fluoro)benzophenone and bis-(4-hydroxy)benzophenone in the presence of potassium carbonate in diphenylsulfone as a solvent have been known, both processes have many difficulties that (1) both processes necessitate a very expensive monomer, (2) it is necessary to carry out the reaction at a very high temperature of 360° C. and to use a solvent of a relatively high melting point, diphenylsulfone, and (3) impurities are apt to remain in the thus obtained polymer, etc.

On the other hand, in the case of the polymerization by reacting diphenyl ether with phosgene, as is seen in Example 9 of British Pat. No. 1,164,817, the yield of aromatic polyketone is as low as 15% and the inherent viscosity ($\eta$ inh) is as low as 0.13 dl/g, and accordingly the reaction only gives oligomers.

In addition, a process of reacting diphenyl ether with phosgene or an acid chloride in the presence of aluminum chloride or a Lewis' base has been also proposed (refer to WO No. 84/03892), however, at least in the case of using phosgene as the reactant, it is difficult to obtain the objective polymer of a sufficiently high degree of polymerization. Further, in the case of using aluminum chloride as the catalyst in such a process, it is difficult to completely remove such aluminum chloride from the product.

As a result of the present inventors' studies concerning a process for producing aromatic polyketone while overcoming the above-mentioned difficulties, the present inventors have found a process for producing aromatic polyketone of a high degree of polymerization at a remarkably low cost while using easily removable boron trifluoride instead of using aluminum chloride which is difficultly removable from the product or not using any catalyst, and based on the finding, the present invention has been attained.

The object of the present invention is to provide a process for producing aromatic polyketone while overcoming the above-mentioned difficulties.

SUMMARY OF THE INVENTION

In an aspect of the present invention, for producing aromatic polyketone comprising reacting a compound represented by the formula (I):

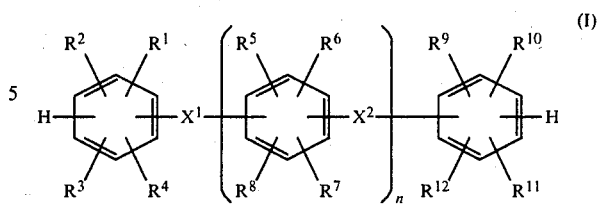

wherein each of $R^1$ to $R^{12}$ preprents a hydrogen atom, a halogen atom, a hydrocarbon group or an alkoxy group; each of $X^1$ and $X^2$ represents an oxygen atom or a sulfur atom and n is an integer of from 0 to 5, with phosgene into reaction (i) in the presence of fluoroalkanesulfonic acid or (ii) in the presence of boron trifluoride in hydrogen fluoride at a temperature of from 65° to 90° C., thereby obtaining aromatic polyketone.

DETAILED DESCRIPTION OF THE INVENTION

The present invention relates to a process for producing aromatic polyketone.

As the aromatic ether represented by the formula (I) according to the present invention, diphenyl ether, bis(3-chlorophenyl)ether, bis(3-methylphenyl)ether, bis(3,5-dimethylphenyl)ether, bis(3-methoxyphenyl)ether, bis(3,5-dichlorophenyl)ether, bis(3-bromophenyl)ether, bis(3-fluorophenyl)ether, bis(3,5-difluorophenyl)ether, bis(3-ethylphenyl)ether, 1,4-diphenoxybenzene, bis(4-phenoxyphenyl)ether, 1,3-diphenoxybenzene, bis(3-phenoxyphenyl)ether, 4,4'-bis(4-phenoxyphenyl)diphenyl ether, (4-phenoxyphenyl)-4'-phenoxydiphenyl ether, 1,4-bis(3-methylphenoxy)benzene, 1,4-bis(3-chlorophenoxy)benzene, 1,4-bis(3-methoxyphenoxy)benzene, 1,4-bis(3,5-dimethylphenoxy)benzene, 1,4-bis(3-bromophenoxy)benzene, 1,4-bis(3,5-difluorophenoxy)-benzene, diphenyl sulfide, bis(3-chlorophenyl)sulfide, bis(3-methylphenyl)sulfide, bis(3,5-dimethylphenyl)sulfide, bis(3-methoxyphenyl)sulfide, bis(3,5-dichlorophenyl)sulfide, bis(3-bromophenyl)sulfide, bis(3-fluorophenyl)sulfide, bis(3,5-difluorophenyl)sulfide, bis(3-ethylphenyl)sulfide, 1,4-bis(phenylthio)benzene, 4,4'-bis(phenylthio)diphenylsulfide, 1,3-bis(phenylthio)benzene, 4,4'-bis[4-phenylthio)phenylthio]diphenylsulfide, 4-(phenylthio)phenyl-4'-phenylthiodiphenylsulfide, 1,4-bis(3-methylphenylthio)benzene, 1,4-bis(3-chlorophenylthio)benzene, 1,4-bis(3-methoxy-phenylthio)benzene, 1,3-bis(3,5-dimethylphenylthio)benzene, 1,4-bis(3,5-difluorophenylthio)benzene, etc. may be mentioned, however, every compound represented by the formula (I) may be used and those compounds used according to the present invention are not limited to the above-mentioned compounds. The compound represented by the formula (I) may be used singly or may be used as the mixture thereof.

Of the compounds represented by the formula (I), compounds having 1,3-structure or 1,4-structure are preferable. In view of the cost of the compound represented by the formula (I), diphenyl ether, 1,4-diphenoxy-benzene, diphenyl sulfide and 1,4-diphenyl-thiobenzene are more preferable.

In the case of reacting a compound represented by the formula (I) with phosgene according to the invention, the amount of phosgene used in the reaction is more than 0.5 mol per one mol of the compound represented by the formula (I) in general, preferably from 1 to 500 mol per one mol of compound represented by the formula (I).

(i) In the case where fluoroalkanesulfonic acid is used in the reaction as a catalyst, the fluoroalkanesulfonic acid have 1 to 18 carbon atoms and it may be completely fluorinated or partially fluorinated. Of the fluoroalkanesulfonic acids, difluoromethanesulfonic acid, trifluoromethanesulfonic acid and pentafluoroethanesulfonic acid may be mentioned as preferable. In addition, it is preferable to use the fluoroalkanesulfonic acid in an amount so that the acid acts as the reaction solvent. However, the reaction process in which the fluoroalkanesulfonic acid is used in a far smaller amount is not excluded from the scope of the present invention. In the reaction, Lewis' acid used generally in Friedel-Crafts reaction may be used together with the fluoroalkanesulfonic acid.

The reaction is carried out at a temperature of 0° to 300° C., preferably 50° to 250° C.

In addition, fluoroalkanesulfonic acid can be easily removed from the reaction system by distillation or washing with an organic solvent or water, whereby aromatic polyketone not containing impurities may be easily obtained.

(ii) In the case of carrying out the reaction in hydrogen fluoride in the presence of boron trifluoride at a temperature of from 65° to 90° C., the amount of hydrogen fluoride used in the reaction is 0.5 to 500 times by weight of the compound presented by the formula (I), preferably 2 to 100 times by weight thereof, and the amount of boron trifluoride used in the reaction is 0.5 to 100 times by mol of that of phosgene, preferably 0.9 to 50 times by mol thereof.

It is necessary to carry out the reaction at a temperature of 65° to 90° C., preferably from 67° to 80° C., and in the case where the reaction is carried out at room temperature, only the oligomer is obtained in a low yield as seen in Example 9 of British Pat. No. 1,164,817. The reason why the reaction proceeds smoothly at a higher temperature is presumed as follows. Because of the difficulty of forming a complex between phosgene and boron trifluoride at a low temperature, the acylation proceeds with difficulty. However, at a higher temperature, phosgene reacts with hydrogen fluoride to form chloro-fluorocarbonyl or difluorocarbonyl, and the thus formed carbonyl forms a complex with boron trifluoride. At such a higher temperature the thus formed complex is apt to react with the compound represented by the formula (I).

It is also presumed that chlorofluorocarbonyl is reacted with a compound represented by the formula (I) to form an acyl chloride, and the thus obtained acyl chloride reacts with hydrogen fluoride thereby obtaining acyl fluoride, and then the thus obtained acyl fluoride forms a complex with boron trifluoride and further reacts with the compound represented by the formula (I) to introduce a ketone coupling into the product.

In addition, in the case of formation of difluorocarbonyl, it is presumed that the acyl fluoride is formed by the above-mentioned reaction, and the ketone coupling is introduced by the reaction of the thus formed acyl fluoride with boron trifluoride. However, the degree of polymerization is also reduced in the case where the reaction temperature is over 90° C., and such a high temperature is not favorable.

According to the present invention, aromatic polyketone of a high degree of polymerization can be obtained in a high yield, and in addition, there are merits therein that (i) in the case where the compound represented by the formula (I) and phosgene are reacted in the presence of fluoroalkanesulfonic acid as a catalyst, the catalyst is easily removable and (ii) in the case where the compound represented by the formula (I) and phosgene are reacted in the presence of boron trifluoride as a catalyst in hydrogen fluoride at a temperature of 65° to 90° C., the catalyst used in the reaction is also easily removable from the product.

The aromatic polyketone obtained according to the present invention has a number of merits.

Namely, the aromatic polyketone according to the present invention is excellent in mechanical properties such as tensile strength, flexural strength, tensile modulus and flexural modulus, etc., heat-resistance, electrical properties and dimensional stability, and is low in hygroscopicity and water absorption and high in the temperature of commencing thermal decomposition. Accordingly, the aromatic polyketones of the present invention have the same utilities as the utilities of known polyketone compounds.

The present invention will be explained more in detail while referring to the following non-limitative examples.

EXAMPLE 1

Into a 100 ml-autoclave made of a special alloy (Hasteloy ®-C), 1.703 g (10 mmol) of diphenyl ether and 15.07 g (100 mmol) of trifluoromethanesulfonic acid were introduced, and while cooling the autoclave to $-78°$ C., 4.95 g (50 mmol) of phosgene were added into the autoclave under a reduced pressure, and after restoring the pressure to ordinary, the content of the autoclave was warmed to room temperature. Thereafter, the content of the autoclave was reacted for 48 hours at 120° C., and after purging phosgene and hydrogen chloride, the reaction mixture was added to 100 ml of methanol. After collecting the thus formed polymer by filtrating the mixture, the thus collected polymer was washed two times with each 100 ml of hot methanol, two times with each 100 ml of a hot aqueous 2% solution of sodium hydroxide, two times with each 100 ml of a hot aqueous 5% solution of hydrochloric acid, two times with each 200 ml of distilled water and once with 200 ml of methanol in the order, and then the thus washed polymer was dried in vacuum at 120° C. for 24 hours. The yield of the thus obtained polymer was 100% on the basis of diphenyl ether. When the thus obtained polymer was dissolved into 97% sulfuric acid at a concentration of 1 g of the polymer/dl and the solution was subjected to determination of the viscosity to know that $\eta$ inh was 0.95 dl/g. In the infrared absorption spectrum of the thus obtained polymer, an absorption max. at 1240 cm$^{-1}$ corresponding to aromatic ether and an absorption max. at 1650 cm$^{-1}$ corresponding to aromatic ketone were observed.

EXAMPLE 2

In the same manner as in Example 1 except for carrying out the reaction for 20 hours at 100° C. and further for 48 hours at 110° C., a polymer was obtained. The inherent viscosity ($\eta$ inh) of the thus obtained polymer was 0.23 dl/g.

EXAMPLE 3

After introducing 1.703 g (10 mmol) of diphenyl ether and 10 ml of hydrogen fluoride into a 100 ml-autoclave made of Hasteloy ®-C at 0° C., and cooling the content of the autoclave to −78° C., 8 ml (117.6 mmol) of phosgene and 10 ml of hydrogen fluoride were added to the thus cooled content of the autoclave. When boron trifluoride was added to the content of the autoclave at 23° C., the pressure within the autoclave became 10 kg/cm². Thereafter, the content of the autoclave was subjected to reaction for 48 hours at 70° C., and after purging boron trifluoride, phosgene and hydrogen chloride from the autoclave, the reaction mixture was introduced into ethanol. The thus formed liquid was washed with 500 ml of an aqueous 3N sodium hydroxide solution, 200 ml of an aqueous 1N hydrochloric acid solution, 200 ml of hot ethanol, 500 ml of water and 200 ml of ethanol in the order, and then vacuum-dried at 120° C. for 24 hours to obtain the object product, aromatic polyketone, in a yield of 100% based on diphenyl ether used. The inherent viscosity ($\eta$ inh) of the aromatic polyketone in 97% sulfuric acid at a concentration of 1 g/dl measured at 30° C. was 0.79 dl/g.

COMPARATIVE EXAMPLE 1

In the same manner as in Example 3 except for carrying out the reaction at 20° C. instead of 70° C. in Example 1, aromatic polyketone of an inherent viscosity ($\eta$ inh) of 0.1 dl/g was obtained.

EXAMPLES 4 AND 5

In the same manner as in Example 3 except for carrying out the reaction at 65° C. in Example 4, and at 80° C. in Example 5 instead of 70° C. in Example 3, two kinds of aromatic polyketone were obtained, the results being shown in Table 1.

TABLE 1

| Example No. | Reaction temperature (°C.) | $\eta$inh (dl/g) |
|---|---|---|
| 4 | 65 | 0.20 |
| 5 | 80 | 0.29 |

COMPARATIVE EXAMPLE 2

In the same manner as in Example 3 except for carrying out the reaction at 60° C. instead of 70° C. in Example 3, aromatic polyketone of an inherent viscosity ($\eta$ inh) of 0.06 dl/g was obtained.

What is claimed is:

1. A process for producing aromatic polyketone, comprising reacting a compound represented by the formula (I):

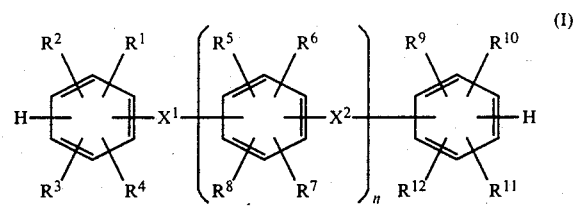

wherein each of $R^1$ to $R^{12}$ represents a hydrogen atom, a halogen atom, a hydrocarbon group or an alkoxy group; $X^1$ and $X^2$ respectively represent an oxygen atom or a sulfur atom and n is an integer of from 0 to 5, with phosgene (i) in the presence of a fluoroalkanesulfonic acid or (ii) in hydrogen fluoride in the presence of boron trifluoride at a temperature of from 65° to 90° C.

2. The process according to claim 1, wherein said compound represented by formula (I) is selected from the group consisting of diphenylether, 1,4-diphenoxybenzene, diphenylsulfide and 1,4-diphenylthiobenzene.

3. The process according to claim 1, wherein more than 0.5 mol of phosgene per one mol of said compound represented by the formula (I) is used.

4. A process according to claim 1, wherein said fluoroalkanesulfonic acid is selected from difluoromethanesulfonic acid, trifluoromethanesulfonic acid or pentafluoroethanesulfonic acid.

5. The process according to claim 1, wherein said compound represented by formula (I) and phosgene are reacted in the presence of a fluoroalkanesulfonic acid at a temperature of from 0° to 300° C.

6. The process according to claim 1, wherein the amount of hydrogen fluoride in step (ii) of claim 1 is 0.5 to 500 times by weight of the amount of said compound represented by formula (I).

7. The process according to claim 1, wherein the amount of boron trifluoride in step (ii) of claim 1 is 0.5 to 100 mole per mole of phosgene.

8. The process according to claim 5, wherein said reaction is conducted at a temperature ranging from 50° to 250° C.

9. The process according to claim 1, wherein the reaction of step (ii) occurs at a temperature of from 67° to 80° C.

10. The process according to claim 7, wherein the amount of boron trifluoride ranges from 0.9 to 50 moles per mole of phosgene.

* * * * *